(No Model.) 2 Sheets—Sheet 1.
R. S. DOBBIE.
TROLLEY HEAD.
No. 502,553. Patented Aug. 1, 1893.
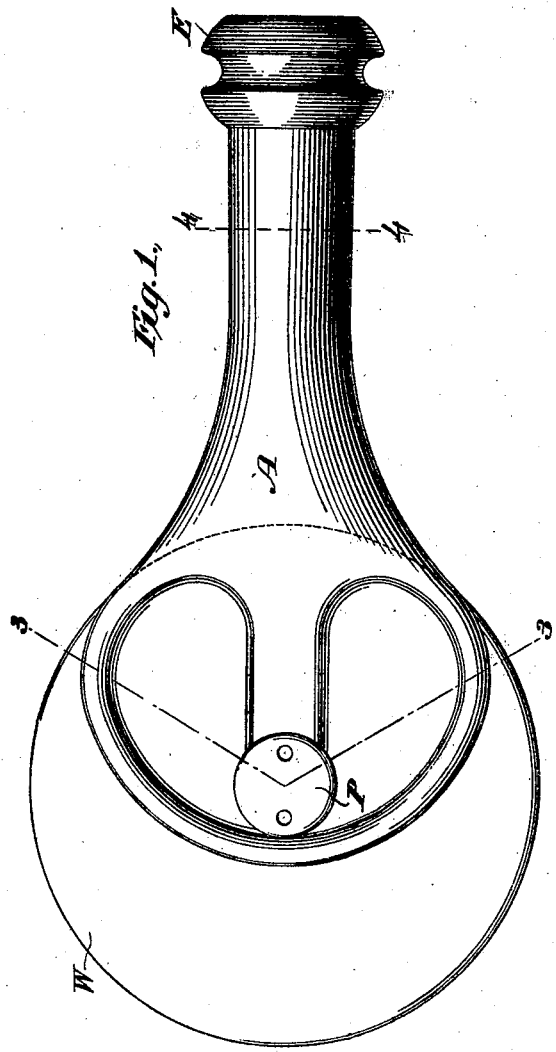
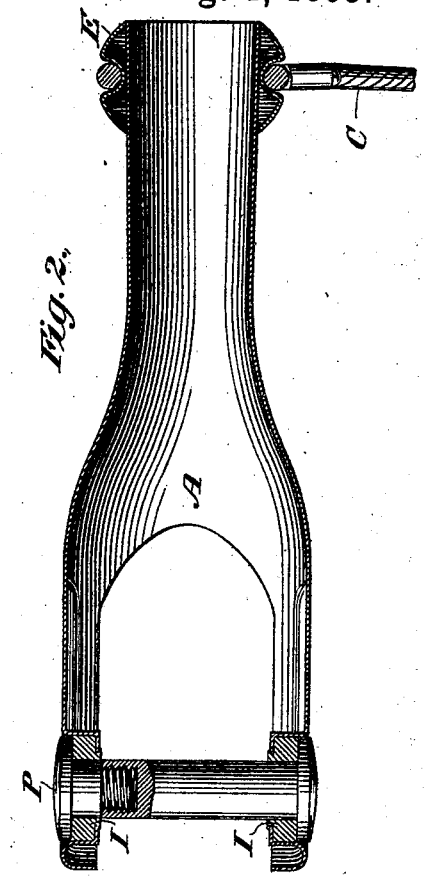
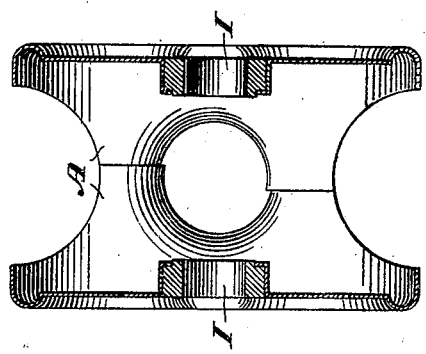
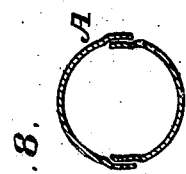
Witnesses
C. E. Ashley
H. W. Lloyd
Inventor
Robert S. Dobbie
By his Attorney
Charles J. Kintner (No Model.) 2 Sheets—Sheet 2.
R. S. DOBBIE.
TROLLEY HEAD.
No. 502,553. Patented Aug. 1, 1893.
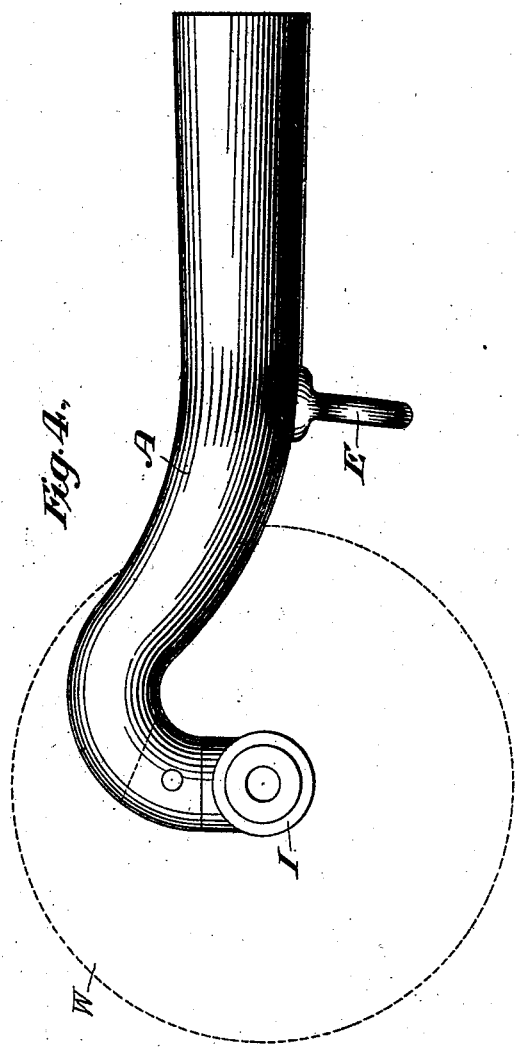
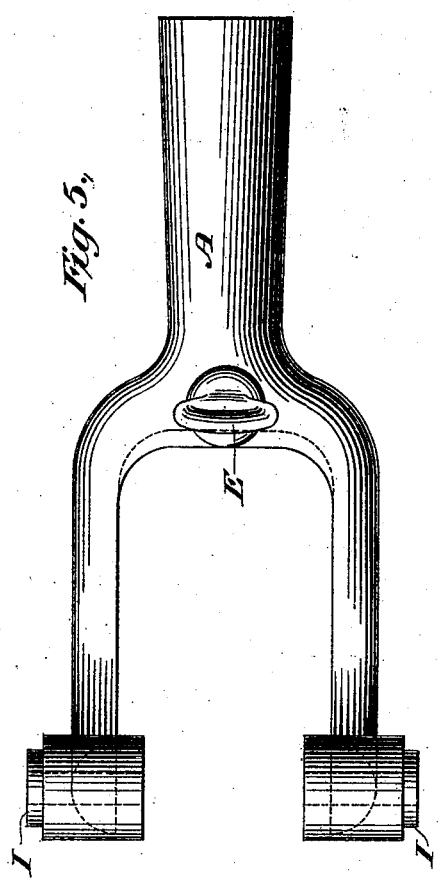
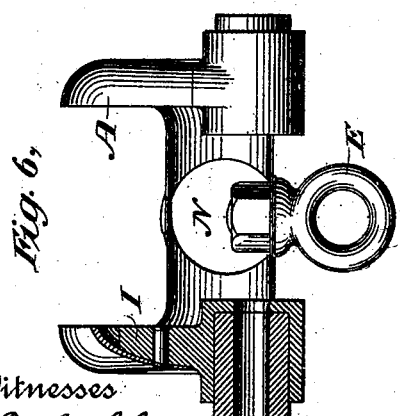
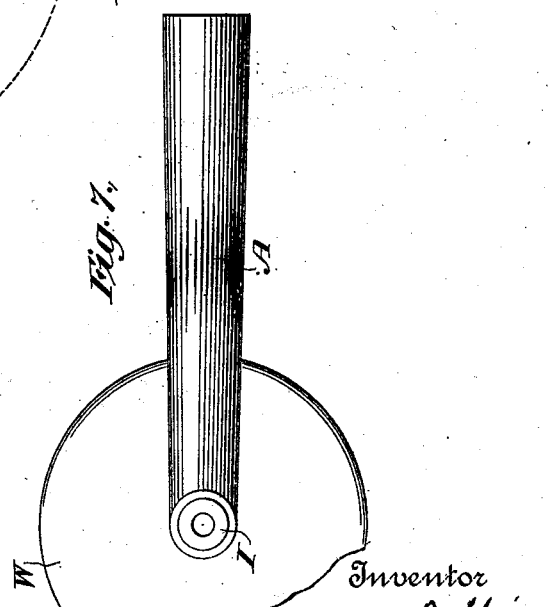
Witnesses
C. E. Ashley
H. W. Lloyd
Inventor
Robert S. Dobbie
By his Attorney
Charles J. Kintner

UNITED STATES PATENT OFFICE.

ROBERT S. DOBBIE, OF JERSEY CITY, NEW JERSEY, ASSIGNOR OF ONE-HALF TO OTTO RAU, OF MILWAUKEE, WISCONSIN.

TROLLEY-HEAD.

SPECIFICATION forming part of Letters Patent No. 502,553, dated August 1, 1893.

Application filed October 31, 1891. Serial No. 410,544. (No model.)

*To all whom it may concern:*

Be it known that I, ROBERT S. DOBBIE, a citizen of the United States, residing at Jersey City, in the county of Hudson, in the State of New Jersey, have made a new and useful invention in Trolleys or Trolley-Supports for Use in Connection with Electric Railways and in Analogous Places, of which the following is a specification.

My invention is directed particularly to a novel form of trolley arm or support, and it has for its object the production of such an arm or support as will possess a maximum amount of strength with a minimum weight and also shall be cheaply and easily constructed. I accomplish this object by the use of the trolley arm or support hereinafter described and particularly pointed out in the claims which follow this specification.

For a full and exact understanding of my invention reference is had to the accompanying drawings in which—

Figure 1 is a side elevational view of one form of my improved trolley arm or support, and Fig. 2 a longitudinal sectional view thereof, showing the trolley pin partly broken away, while Fig. 3 is a sectional end elevational view of Fig. 1, taken on the angular line 3—3, the trolley pin being removed. Fig. 4 is a side elevational and Fig. 5 a plan view of a modified form of my invention. Fig. 7 is a side elevational view of a third modified form. Fig. 6 being an end elevational view of Fig. 4, shown also partly in section. Fig. 8 is a cross sectional view of Fig. 1 taken on the line 4—4 and illustrating the manner of uniting the two halves of the trolley arm or support together.

Prior to my invention it was old in the art to construct tubular trolley poles and to attach the trolley arm or support thereto in various ways. Such a device, however, is open to the objection that the parts are liable to become detached and the trolley caused to assume unequal wear upon its journal bearings. They are also open to the objection of possessing undue weight.

My improved trolley arm or support consists preferably of two pieces of semi-tubular struck up metal A, made of steel or any preferred material which possesses the necessary strength. The pieces of metal are struck up in a die so as to assume the tubular conformation shown in Figs. 1 and 2, with the enlarged ears or ends having the inwardly projecting extensions for the purpose of sustaining the pivot bearings I, said enlarged portions being preferably ribbed centrally, as shown, for the purpose of giving greater strength to the yoke or Y portion which supports the trolley pin P. After the parts A are produced in the manner described they are laid together so that the body portion thereof constitutes a tube and the inwardly projecting portions are in alignment with each other, and they are then brazed together, or united in any manner well understood by metal workers. The pivot bearings I are placed in the position shown in Figs. 2 and 3, and secured either by riveting them on their inner faces or in any preferred manner. Afterward the struck up or spun metal thimble E is brazed or otherwise secured in position around the lower end of the arm or support. This thimble serves the double function of aiding in holding the parts firmly together and as a fastening device for the operating cord or guy C. The trolley W is then put in place and the trolley pin P inserted in the usual way.

In the modified form shown in Fig. 4, the support A is made of two semi-tubes A united together in the manner already described and provided with a goose-neck having an upward turn to ward off or carry over the guy wires which sustain the trolley wire. The enlarged portions of the parts A, in Figs. 1 and 2, serve the same function.

The pivot bearings I are supported in the ends of the yoke, in the form shown in Fig. 4, in the same manner as heretofore described in connection with Figs. 1 and 2, see Fig. 6. The thimble E, however, of Fig. 2, is replaced in Figs. 4, 5 and 6 by an eye secured at the base of the yoke by a nut N.

The form shown in Fig. 7 is constructed in the same manner as those already described, the only difference being that in this form the yoke or sustaining portion lies in the same plane with the body of the support. This form is not regarded by me as being as desirable as the form shown in Figs. 1, 2, 4, 5 and 6, for the reason that the trolley W is not protected from the action of the guy wires as fully as it is in the forms illustrated in the aforesaid figures by the enlarged portion and goose-neck arrangement.

It will be understood, of course, that the trolley pole may be united to the trolley support A by inserting it in the tubular opening at the free end thereof or by screwing it thereto, or in any preferred way, or if desired, the part A may be made of sufficient length to constitute not only the support, but the entire trolley pole.

I do not limit myself to the specific constructions herein shown, as I believe I am broadly entitled to claim a trolley support made in two halves united together in the nature of a tube, the yoke or Y portion being integral with the base or body of the tube, and my claims are designed to include all such structures, as for instance a solid tube split to form the yoke.

Having thus described my invention, what I claim, and desire to secure by Letters Patent of the United States, is—

1. A trolley arm or support made of two pieces of semi tubular centrally ribbed struck up metal constituting a fork which carries the trolley, said pieces being joined together at their lower ends in the nature of a tube, substantially as described.

2. A trolley arm or support constructed of two divided struck up metal portions of curvilinear form in cross section throughout their length said parts being secured together at their lower ends and by the trolley pivot, at their upper ends substantially as described.

3. A trolley arm or support made of two thin struck up semi-tubular parts united together at their lower ends and constituting a fork, in the upper end of which the trolley is pivoted substantially as described.

4. A trolley arm or support made of two semi-tubular struck up pieces of metal united together at their lower ends to form a tube and ribbed as described to give them greater strength.

5. A trolley arm made of two semi-cylindrical struck up pieces of metal united together in the form of a tube and constituting a fork or support at their upper ends in which the trolley is pivoted, substantially as described.

6. A trolley arm or support made of two semi-tubular pieces of metal united together and divided at their upper ends into a U or Y-shape, so as to form a seat for the trolley, said seat being integral with the pole substantially as described.

7. A trolley arm or support consisting of a fork of two semi-tubular pieces of metal having a goose-neck shape and united together, substantially as described.

8. A trolley arm or support made of two pieces of struck up metal surrounded with a metallic thimble E, substantially as described.

ROBERT S. DOBBIE.

Witnesses:
  C. J. KINTNER,
  OTTO RAU.